United States Patent [19]

Hansman, Jr.

[11] Patent Number: 4,729,245
[45] Date of Patent: Mar. 8, 1988

[54] METHOD AND APPARATUS FOR MONITORING LIQUID VOLUME/MASS IN TANKS

[75] Inventor: Robert J. Hansman, Jr., Cambridge, Mass.

[73] Assignee: Massachusetts Institute of Technology, Cambridge, Mass.

[21] Appl. No.: 815,583

[22] Filed: Jan. 2, 1986

[51] Int. Cl.$^4$ .............................................. G01F 17/00
[52] U.S. Cl. ......................................... 73/865; 73/149
[58] Field of Search ..................... 73/149, 290 V, 865; 331/65; 367/908

[56] References Cited

U.S. PATENT DOCUMENTS

| 3,237,451 | 3/1966 | Haeff | 73/149 |
|---|---|---|---|
| 3,312,107 | 4/1967 | Burns et al. | 73/290 |
| 3,540,275 | 11/1970 | Post et al. | 73/290 |
| 3,988,933 | 11/1976 | Fletcher et al. | 73/865 |
| 4,599,892 | 7/1986 | Doshi | 73/290 B |

FOREIGN PATENT DOCUMENTS 873538  7/1961  United Kingdom ................ 367/908

OTHER PUBLICATIONS

Shubaev, "Design of Transducers Used for the Electromagnetic Reception of Rayleigh and Lamb Waves", Sov. J. Nondestructive Testing (USA), vol. 9, No. 1, Feb. 1973.

"The Slotted Section and Traveling Probe", *Measurements of Standing Waves*, pp. 478–480, Phillip H. Smith, Electronics, Jan. 1939 and Jan. 1944.

"Measurement of Individual Hydrometeor Absorption Cross Sections Utilizing Microwave Cavity Perturbation Techniques", reprinted from *Journal of Atmospheric and Oceanic Tech.*, vol. 1, No. 4, 12/84.

"Mass Gauging in Low Gravity", Dr. R. A. Crane, Internal NASA Report, circa 1982.

"Design Development and Manufacture of a Breadboard Radio Frequency Gauging System", vol. 1, Phase B, Final Report, Bendix Corporation, Nov. 15, 1974, NASA-CR-120620.

*Primary Examiner*—Stewart J. Levy
*Assistant Examiner*—Robert R. Raevis
*Attorney, Agent, or Firm*—Hamilton, Brook, Smith & Reynolds

[57] ABSTRACT

A substantially fluid orientation insensitive, simple, relatively inexpensive gauge for measuring the quantity (mass/volume) of a liquid, such as fuel, stored in a tank subjected to low gravity conditions is disclosed. The gauge comprises, in general, a transmitter and a receiver coupled to a liquid storage tank in which a liquid of known dielectric behavior, such as fuel for a space vehicle, is stored. The transmitter comprises an R.F. oscillator for generating R.F. energy across a predetermined variable frequency range. The transmitted R.F. energy is coupled to an antenna inserted into the tank and is also coupled to an R.F. energy detector. The receiver measures the received power as a function of frequency above and below the dominant resonant frequency, or harmonics thereof. The measured power decreases substantially before and after resonance because, at resonance, most of the power is absorbed or stored in the cavity and less is transmitted to the receiver. The measured power versus frequency as sensed by the receiver is used to calculate the quality factor, "Q" which is inversely proportioned to the amount of fluid in the tank.

10 Claims, 3 Drawing Figures

METHOD AND APPARATUS FOR MONITORING LIQUID VOLUME/MASS IN TANKS

DESCRIPTION

TECHNICAL FIELD

This invention is in the field of measuring liquid stored in tanks and, in particular, the measurement of such liquids in zero or near zero gravity conditions.

BACKGROUND ART

Conventional techniques for measuring liquids, such as fuel, contained in storage tanks under normal gravity forces, are no longer satisfactory under the environmental conditions of space flight wherein low gravity conditions are encountered. Despite extensive research and development in this area, since at least the early 1960's, a satisfactory system for measuring liquid volume and/or mass in space conditions has not been found.

Theoretical solutions to the problem abound. Chief among these proposed solutions are the following:

1. Capacitance gauge units, in which a three dimensional array of wires are strung across the interior of the fuel tank to form sets of capacitance grids. These sensors have been found to be excessively heavy and attitude sensitive.

2. Light attenuation, in which suitable dyes are applied to the fuel to enable light attenuation through the liquid and vapor to determine mass quantity. Suitable dyes were not found and the maintenance of optical parts in the cryogenic environment of certain space fuels was found to be too difficult to warrant further investigation.

3. Nuclear detectors, in which emissions from radioactive sources placed in the fuel tank are used to measure fuel quantity. These detectors were found to be of limited applicability and to present a radiation hazard.

4. PVT gauges in which a diaphragm is moved to produce pressure changes in a reference cavity and the pressure response from pressure transducers in the fuel tank and reference cavity is used to measure liquid volume. The power requirements for compression of large volumes of gas was found to be so excessive as to render this technique impractical.

Other techniques found wanting in certain respects involved resonance infrasonics (weighted externally driven diaphragm which oscillates as a function of ullage compressibility); mass metering (accurate inflow-/outflow metering with careful accounting using Corioles flow meters or radio frequency flow meters); and ultrasonic waveguide or acoustic devices.

A technique which appeared to have great promise is described in U.S. Pat. No. 3,540,275 entitled "Method and Apparatus for Measuring Liquid Volume in a Tank" issued Nov. 17, 1970 to Post et al. In the apparatus of the '275 patent, a tank containing a lossy dielectric liquid fuel is excited by electromagnetic energy. The electromagnetic energy is swept or varied over a predetermined frequency band to excite a plurality of modes of oscillation. The number of modes excited is related to the average dielectric constant of the total contents of the tank cavity. From the average dielectric constant value, the mass of the liquid is obtained. The advantages of this system include the use of a single transmitter receiver with direct mass measurement and its applicability to both liquid oxygen ($LO_2$) and liquid helium ($LH_2$).

The disadvantages are that the complex relationship between the number of modes excited and the average dielectric constant prevents accuracy of measurement. In practice, the requisite degree of accuracy, i.e., $\pm 1\%$, has not been achieved by the mode counting technique with $\pm 8\%$ being the norm, despite many years of testing.

Another prior art system is described in the '275 patent; the swept frequency oscillator approach of U.S. Pat. No. 3,312,107 issued Apr. 4, 1967 to Burns, et al. In the system of the '107 patent, electromagnetic energy from a sweep oscillator is coupled to a tank and a detector determines the resonant frequency of the tank as the energy is swept in frequency. The sweep is interrupted and started over again each time a resonant frequency is detected. This cycle is continuously repeated and the time intervals between sweep cycles, i.e., change in resonant frequency, is used to indicate the quantity of liquid in the tank. Post et al. in the '275 patent criticizes the Burns et al. technique on the grounds that the resonant frequency changes with fuel (liquid) orientation and, hence, is inherently inaccurate.

DISCLOSURE OF THE INVENTION

The above-referenced description of the state of the prior art indicates that a long felt need exists for a relatively inexpensive gauge for measuring, under low gravity conditions, the quantity (mass/volume) of a liquid fuel stored in a tank. Such a gauge should be insensitive to fluid orientation and of simple and inexpensive design. This need is fulfilled, in accordance with the apparatus and method of the invention which comprises, in general, a transmitter and a receiver coupled to a liquid storage tank in which a liquid of known dielectric constant and dielectric conductivity, such as fuel for a space vehicle, is stored.

In a first embodiment, the transmitter comprises an R.F. oscillator capable of generating R.F.* energy across a predetermined variable frequency range. The transmitted R.F. energy is coupled to an antenna inserted into the tank and is also coupled to an R.F. energy detector. The antenna is preferably located along the longitudinal axis of the tank and is adapted to predominantly propagate R.F. energy in an axially symmetric mode of propagation, i.e., TEM mode, such that the electric field strength varies principally as a function of axial tank cavity length. The receiver measures the received power as a function of frequency above and below the dominant resonant frequency, or harmonics thereof.

*R.F. is intended to comprise electromagnetic energy across a frequency spectrum of 3 megacycles per second to 30 gigacycles per second which encompasses and includes microwave energy.

The measured power decreases substantially before and after resonance because, at resonance, most of the power is absorbed or stored in the cavity and less is transmitted to the receiver. The measured power versus frequency as sensed by the receiver is used to calculate the quality factor, "Q". The Q is proportional to the ratio of the R.F. energy stored in the tank or cavity versus the R.F. energy dissipated, and hence, inversely proportioned to the amount of fluid in the tank. The Q is inversely proportional to the width of the resonance curve (power versus frequency) at half maximum power. Accordingly, the width of the resonant frequency at half maximum is a simple preferred method for obtaining Q.

Measuring the Q, as contrasted to the prior art technique of measuring changes in resonant frequency, produces a relatively orientation insensitive method of determining fluid consumption. This is for the reason that the Q method is based on the absorption of the R.F. energy by the fluid, rather than the change in mode structure, resulting in the change in resonant frequency. The amount of R.F. energy absorbed by the liquid is primarily dependent on the mass of liquid present and only very minimally dependent on the orientation of the fluid. This slight dependence can be further minimized by the appropriate choice of resonant modes measured and by averaging measurements over several modes.

BEST MODE OF CARRYING OUT THE INVENTION

Figure 1:
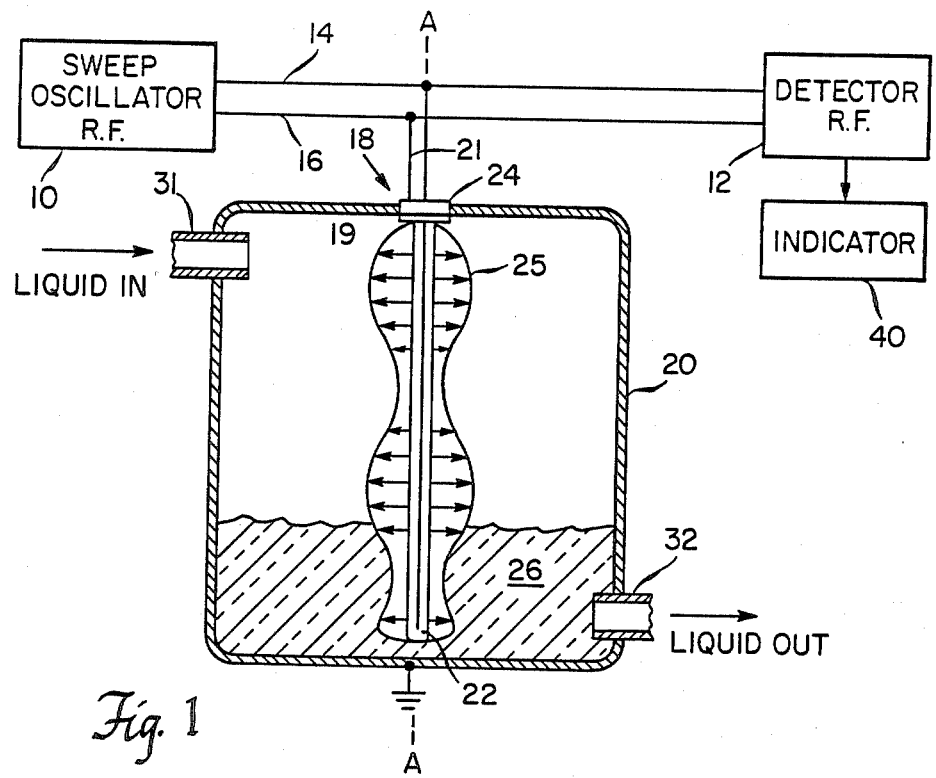
FIG. 1 is a schematic drawing of the apparatus of the invention.

The invention will now be described in detail in connection with FIGS. 1 and 2 of the drawings. Referring specifically to FIG. 1, there is shown a sweep oscillator 10 which preferably comprises an R.F. sweep oscillator capable of providing a varied frequency over a predetermined range. The frequency varies linearly and the predetermined frequency range is within a narrow spectrum near the calculated resonant frequencies of fuel storage tank 20.

The fuel tank 20 forms an inner cavity in which a dielectric fluid, such as liquid oxygen, $LO_2$, or liquid hydrogen, $LH_2$, 26 may be stored. Input ports 31 and output ports 32 are provided, respectively, for storing and metering out the liquid. The tank may comprise a metal enclosure formed of material, such as stainless steel or aluminum. Coaxial transmission lines 14 and 16 are provided connecting sweep oscillator 10 to detector 12, and also to coaxial antenna 18. Antenna 18 is formed of an inner conductor 19 and a grounded outer conductor 21. Conductor 21 is grounded to the outer tank surface via connector 24.

A sheath 22 of known dielectric constant may be provided around the conductor 19 to protect the center conductor 19 from the environment within the tank. A standing wave of electromagnetic energy, shown by the arrows 25, is propagated along the inner conductor 19 forming the antenna 18. Preferably this standing wave propagates in the Transverse Electromagnetic Mode, or TEM mode, wherein the electric field strength varies principally as a function only of the axial length of the antenna inner conductor 19 and, hence, the axial cavity length, since the antenna extends along the length of the inner cavity. Preferably, the antenna is disposed along the longitudinal axis of the tank, shown in dotted lines A—A.

R.F. detector 12 measures the power received from R.F. sweep oscillator 10 as a function of frequency. From these measurements, the quality factor of the tank "Q", which is the ratio of the power stored to the power dissipated, is determined and the results displayed on indicator 40. Indicator 40 may thus be calibrated in terms of quantity of fuel 26 remaining in the tank, since the quality factor Q is inversely proportional to the amount of fluid in the tank.

Thus, as the amount of fluid decreases, less power is absorbed in the tank and the resonant width at half-power increases, and the quality factor, Q, increases. Therefore, it may be seen that the quality factor, Q; which is inversely proportional to the full width of the resonance curve at half maximum, may be used as a means of determining the quantity of the liquid within the cavity. Thus, by simply sweeping sweep oscillator 10 through several resonant frequencies and measuring the power at R.F. detector 12, it is possible to determine the quality factor, Q, at each resonant frequency. These measurements are then averaged to produce a value of liquid mass present in the tank. This value is relatively insensitive to fluid orientation for the reason that Q is a function of energy absorbed and the energy absorbed is primarily dependent on the liquid mass present in the tank. Preferably, at least two or three modes of resonance are swept in this fashion to average out readings. The average of these measurements is used to calculate Q, which is then displayed in terms of liquid quantity or mass on a suitably calibrated indicator 40.

Figure 2:
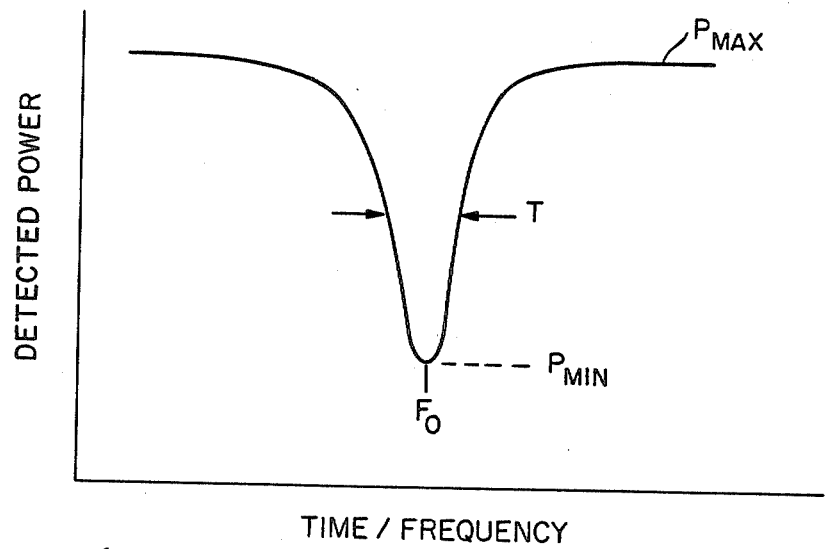
FIG. 2 is a plot of detected power versus time/frequency illustrating the technique for calculating Q (quality factor) in accordance with the invention.

A typical trace of a resonance curve plotting crystal voltage at detector 12 versus time or, equivalently frequency, is shown in FIG. 2. At resonance, the tank plus liquid is highly absorptive, thus detected power is low and the power received by the detector is minimal, $P_{min}$, at the resonant frequency $F_o$. Conversely, off of resonance the received power increases to a maximum $P_{max}$. The loaded Q of the tank is equal to $F_o/T$, where T is the full width at half maximum of the resonance.

Figure 3:
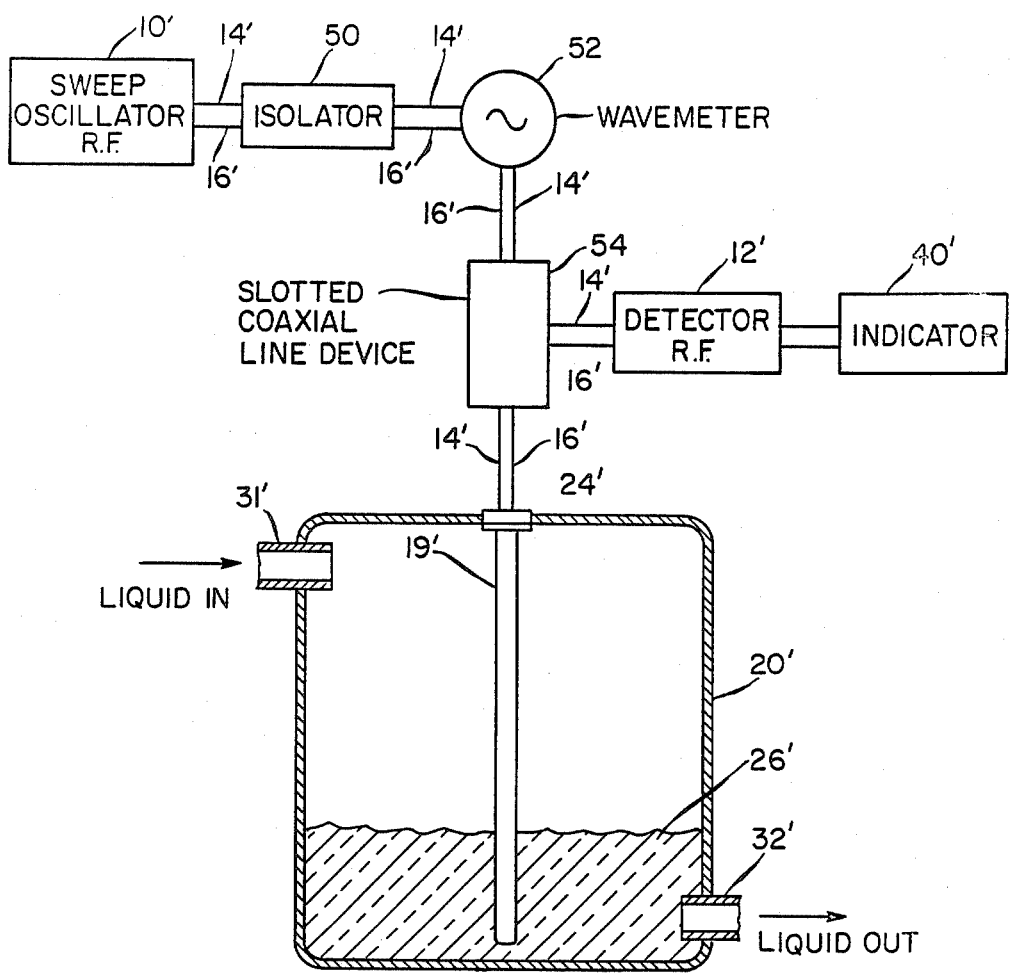
FIG. 3 is a schematic drawing of an alternate embodiment of the invention using VSWR measurements to determine the quality factor, Q.

The alternate embodiment of FIG. 3 may be preferable for fluids with high loss tangent (low dielectric conductivity) or wherein measurements are required at high levels of fluid mass, in which case, low Q value measurements are required. In such cases, the resonance becomes so broad that the half-power points are difficult to discern and measure.

In FIG. 3, like numerals with a "prime" superscript are used for like items in FIG. 1. As shown in FIG. 3, a sweep oscillator 10' is coupled to the antenna 19' in tank 20' via an isolator 50, a wavemeter 52 and a slotted coaxial line device 54.

The purpose of the isolator 50 is to protect the oscillator from power reflected back to the oscillator 10'. Wavemeter 52 is a well-known calibrated frequency measuring device which is used to determine the frequencies of the sweep oscillator 10'.

The slotted coaxial line 54 is also a well-known device which is used in conjunction with detector 12' for the measurement of the Voltage Standing Wave Ratio (VSWR). The magnitude and phase of the VSWR generated in the slotted coaxial line device 54 is related to the cavity Q through well-known measurement techniques. (See pages 478–480 of "Techniques of Microwave Measurement" by Montgomery, *MIT Radiation Laboratories Series,* 1947.)

The VSWR of electromagnetic energy generated by sweep oscillator 10' entering and refflected from tank 20' is determined by the slotted coaxial line 54 and wavemeter 52. The signal received by R.F. detector 12' coupled to slotted coaxial line 54 is used to measure the quantity of material in the tank based upon the VSWR. This VSWR method is applicable over a broad range of Q, including the range of values likely to be encountered in the apparatus of this invention.

Equivalents

This completes the description of the specific embodiments of the present invention. It is to be understood, however, that the invention is not limited thereto as many variations will be apparent to those skilled in the art. For example, other methods for measuring R.F. power absorbed by the liquid or the quality factor Q, may be used as an alternate to the above. For example, a transmission loss approach may be used wherein power is transmitted through the tank and a receiver antenna in the tank detects the received power. The power lossed in transmission through the tank is used to determine the Q and hence, liquid mass present. The "ring down" or decrement measurement method, described at pages 340-342 of the above referenced text, may be used for very high Q cavity systems.

Furthermore, it should be understood that the interconnection between items in FIGS. 1 and 3 may be made by coaxial lines, as shown, or waveguide, or a combination of both, in which case, a waveguide to coaxial transition device may be required.

While the invention has been described in connection with liquid storage, it is contemplated that the invention may find application for measuring fluids, in general, and other stored materials, such as solids, granular particles, etc.

Accordingly, the invention is to be given its broadest possible interpretation within the scope of the claims appended hereto.

I claim:

1. Apparatus for measuring the quantity of a mass of fluid material of known dielectric constant and conductivity present in a tank comprising:
    (a) a transmitter means for transmitting radio frequency electromagnetic energy for exciting the tank with such electromagnetic energy: and
    (b) receiver means responsive to said transmitter means for determining the ratio of the power entering the tank versus the power reflected from the tank as a function of frequency of the electromagnetic energy.

2. The apparatus of claim 1 including means for determining the ratio of energy stored within the tank versus the energy dissipated within the tank, the quality factor Q, from the sensed power measurements to derive the quantity of material present.

3. The apparatus of claim 1 wherein the transmitter means comprises a sweep oscillator for generating electromagnetic energy across a predetermined frequency spectrum, and wherein the receiver means comprises a wavemeter coupled to said sweep oscillator for determining the frequency of the sweep oscillator for determining the frequency of the sweep oscillator at any given moment, and a slotted coaxial line device coupled to said wavemeter for determining said ratio of the power, generated by the sweep oscillator, entering the tank versus the power reflectd from said tank as a function of frequency, and an antenna in said tank coupled to said coaxial line device for measuring the quantity of material in said tank based upon said ratio.

4. The apparatus of claim 1 where in the fluid is a fuel adapted to be used in a low gravity environment.

5. A method for measuring the quantity of material stored in a tank comprising:
    (a) transmitting radio frequency electromagnetic energy into said tank;
    (b) and determining the voltage standing wave ratio as a function of the electromagnetic energy reflected from the tank versus the energy entering said tank to determine the quantity of material present thereon.

6. The method of claim 5 wherein the ratio of the energy stored within the tank versus the energy dissipated in the tank is determined from the voltage standing wave ratio to derive the quantity of material present in the tank.

7. The method of claim 5 wherein the electromagnetic energy is varied across a frequency spectrum to encompass several frequency resonance modes within the tank and the ratio of the energy stored within the tank versus the energy dissipated in the tank, Q of the tank, is determined over a range of frequency resonances and averaged to derive a value for the quantity of material present.

8. A method for measuring the quantity of a mass of fluid material stored in a tank comprising the steps of:
    (a) coupling R.F. energy to an antenna inserted in the tank said antenna adapted to propagate said energy within said tank in an axially symmetric wave mode in which the electric field strength of the wave varies principally as a function of the axial length of said tank;
    (b) sweeping the frequency of the R.F. energy across a range of frequencies;
    (c) detecting and measuring the power not absorbed in said tank across said range of frequencies;
    (d) from the measurements in step (c), determining the Q said tank at several resonance points;
    (e) from the measurements in step (d), determining the amount of material stored in the tank.

9. The method of claim 8 wherein the material is a liquid fuel and the tank is adapted to be used in a low gravity environment.

10. A system comprising: a metallic fuel tank having input and output ports, said tank forming an inner longitudinally extended cavity in which a dielectric fuel may be stored and metered out to the output port;
    a sweep oscillator for generating a variable frequency range of electromagnetic energy;
    an antenna within said tank disposed along the longitudinal axis thereof and coupled to said sweep oscillator for propagating a voltage standing wave of said energy within said tank, the electric field strength of said wave varying principally as a function of the axial length of said tank; and
    measurement means responsive to the amount of energy absorbed by the fuel to gauge the amount of fuel in said tank, wherein the measurement means determines the ratio of th voltage standing wave of the electromagnetic energy entering said tank versus the voltage standing wave of the electromagnetic energy reflected from said tank to derive the amount of fuel in the tank.

* * * * *

UNITED STATES PATENT AND TRADEMARK OFFICE
CERTIFICATE OF CORRECTION

PATENT NO. : 4,729,245

DATED : Mar. 8, 1988

INVENTOR(S) : Robert J. Hansman, Jr.

It is certified that error appears in the above—identified patent and that said Letters Patent is hereby corrected as shown below:

Claim 4, line 1, "where in" should be ---wherein---.

Claim 5, line 11, "thereon" should be ---therein---.

Claim 8(d), line 38, "Q said" should be ---Q of said---.

Claim 10, line 59, "th" should be ---the---.

Signed and Sealed this

Sixteenth Day of August, 1988

Attest:

DONALD J. QUIGG

Attesting Officer

Commissioner of Patents and Trademarks